E. S. DOYLE.
CULTIVATOR DISK JOURNAL.
APPLICATION FILED JUNE 14, 1910.
981,984.
Patented Jan. 17, 1911.
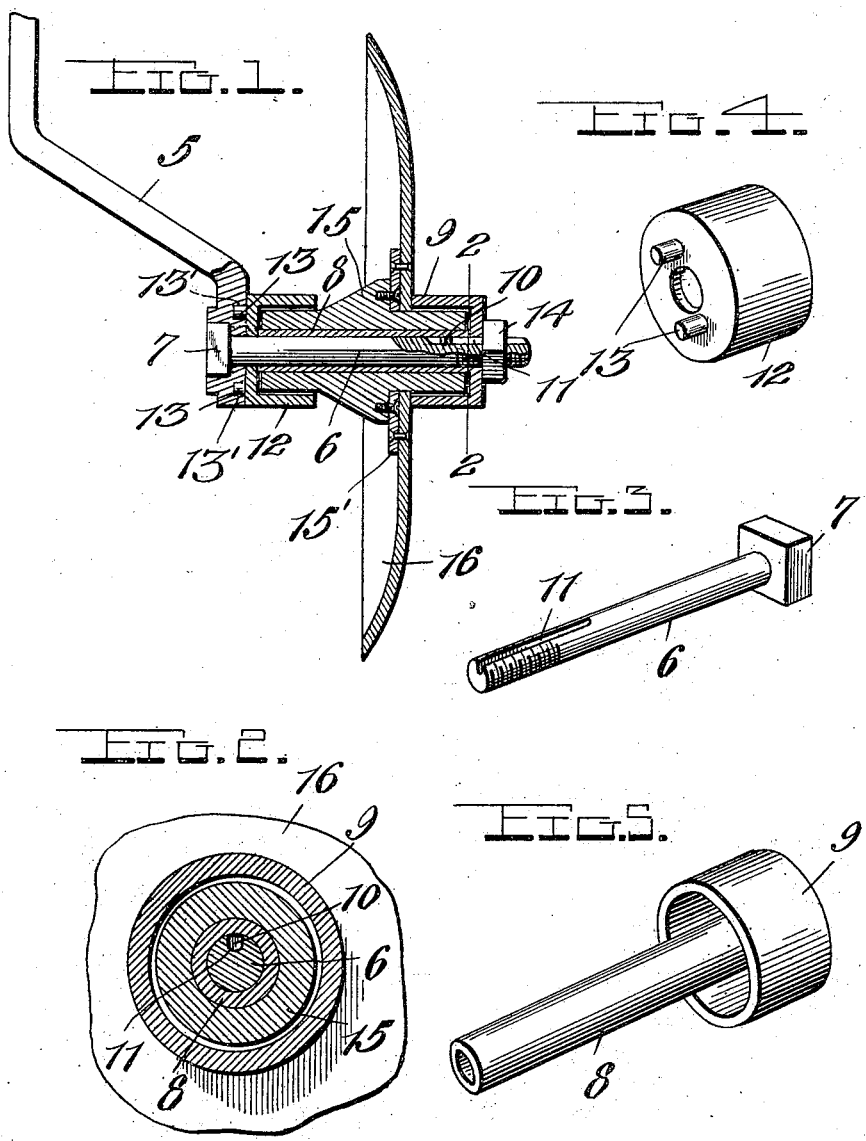
Witnesses
Chas. L. Griesbauer.
E. M. Ricketts
Inventor
E. S. Doyle,
By Watson E. Coleman,
Attorney

UNITED STATES PATENT OFFICE.

EDWARD SILAS DOYLE, OF DENTON COUNTY, TEXAS.

CULTIVATOR-DISK JOURNAL.

981,984.  Specification of Letters Patent.  Patented Jan. 17, 1911.

Application filed June 14, 1910. Serial No. 566,802.

*To all whom it may concern:*

Be it known that I, EDWARD S. DOYLE, a citizen of the United States, residing in the county of Denton and State of Texas, have invented certain new and useful Improvements in Cultivator-Disk Journals, of which the following is a specification, reference being had to the accompanying drawings.

This invention relates to an improved journal for cultivator disks and has for its object to simplify the construction and increase the efficiency of disk journals of this character whereby the disk may be mounted for easy rotation and the cultivation of the various agricultural products facilitated.

Another object resides in the provision of a new and novel journal for arranging the cultivating disk on the supporting shank, a suitable bearing being provided for the disk and means for preventing said bearing from turning with the disk or the release of the disk from its supporting shank.

A still further object is to provide a simple and dust proof disk bearing for cultivators whereby the disk may be easily and quickly arranged for rotation on the end of its supporting shank and reversed when desired for use for different purposes.

With these and other objects in view, the invention consists of the novel features of construction, combination and arrangement of parts hereinafter fully described and claimed, and illustrated in the accompanying drawings, in which—

Figure 1 is a vertical section through the end of a disk supporting shank, the disk and its journal; Fig. 2 is a detail section taken on the line 2—2 of Fig. 1; Fig. 3 is a detail perspective view of the disk supporting arbor; Fig. 4 is a detail perspective view of the dust cap; and Fig. 5 is a similar view of the bearing sleeve.

Referring more particularly to the drawings 5 indicates the hanger rod or shank carried by the frame of the cultivator or plow and may be adjustable with relation thereto so that the depth to which the disk engages in the ground may be regulated. The end of this shank is laterally bent and has its end portion downwardly disposed in an opposite direction to the main body portion thereof. In this end portion an arbor 6 is arranged upon one end of which a square head 7 is formed. This square head is adapted to be seated in a similarly shaped recess or socket in the end of the shank thereby preventing the arbor from rotating.

Upon the arbor 6 a bearing sleeve 8 is arranged and has integrally formed upon one end thereof an annular wall or flange 9. This flange is arranged in spaced concentric relation to the sleeve 8 and provides a cap for preventing the accumulation of dust upon the bearing as will more fully hereinafter appear. Upon the end of the sleeve 8 on which the flange 9 is formed and extending into the bore of the same there is a stud 10. This stud is received in a short longitudinal slot 11 formed in the arbor 6 and extending inwardly from the outer end thereof. A cap 12 is provided with a central perforation and is adapted to be arranged upon the arbor 6. With this cap the inner end of the sleeve 8 has binding engagement. The cap 12 has integrally formed therewith the studs 13 which are arranged at diametrically opposite points and are adapted to be disposed in circular recesses 13' formed in the depending extremity of the supporting shank 5. The outer end of the arbor 6 is threaded to receive a clamping nut 14. This nut binds upon the end of the sleeve 8 on which the flange 9 is provided and forces said sleeve inwardly on the arbor into binding engagement with the cap 12. It will be obvious that when the parts are thus arranged the sleeve is held from independent turning movement on the arbor by means of the lug 10 and the cap 12 is held against rotation by the arrangement of the studs 13 in the sockets 13' on the shank. The arbor itself is prevented from turning by means of the square head 7 thereof. Thus these various parts are securely clamped together so that a very rigid and substantial bearing is provided.

Upon the bearing sleeve 8 the disk hub 15 is adapted to be arranged. The ends of this hub it will be observed are reduced in diameter and the central portion thereof has secured to it an annular plate 15' to which the disk 16 is adapted to be secured by means of suitable rivets or other similar fastening devices. When assembling the parts, the arbor 6 is arranged in the end of the shank and the cap 12 disposed thereon. The hub 15 is now arranged on the arbor and the bearing sleeve 8 is then inserted on the same and into the bore of the hub the outer end of which engages in the annular space provided between the flange 9 formed on said sleeve and the body of the sleeve. Upon adjusting the nut 14 on the end of the arbor, the sleeve and the arbor are secured together as previously described and the flange 9 and the dust cap 12 project over the ends of the hub and obviate all liability of dust entering into the same and accumulating upon the sleeve 8, thereby eliminating all liability of the parts binding and preventing rotation of the disk 16.

From the foregoing it will be seen that I have provided an extremely simple and very efficient cultivator disk journal. The disk may be easily and quickly removed when desired and reversed. Thus the dirt may be thrown inwardly about the roots of the plants and upon the weeds. By reversing the same the weeds may be thrown outwardly beyond the plants and between the rows and then gathered.

The device is adapted to be used with any form of cultivator or plow and eliminates the necessity of employing a fender as it will prevent all accumulations of grass or weeds about the cultivator or plow points, thus allowing the plows to disturb the earth and dispose the same about the roots of the plants after the accumulations of weeds or other material have been removed.

While I have shown and described the preferable embodiment of my invention, it will be understood that the same may be variously modified without departing from the essential feature or sacrificing any of the advantages thereof.

Having thus described the invention what is claimed is:—

1. In combination, an arbor, a dust cap arranged on said arbor, pins carried by said dust cap engaging in the shank to prevent rotation of the dust cap, a sleeve arranged on the arbor, a lug extending into the bore of the sleeve engaging in said arbor to prevent rotation of the sleeve, said sleeve having an annular concentric flange formed on one end thereof, a hub arranged on the sleeve for rotation extending into said dust cap and into the space between the flange and said sleeve, and a clamping nut adapted to move the sleeve inwardly on the arbor into binding engagement with said dust cap, substantially as and for the purpose set forth.

2. In combination, an arbor, a dust cap on said arbor, means for preventing the rotation of said cap, a bearing sleeve arranged on said arbor, a lug formed on the sleeve projecting into the bore thereof, said arbor having a longitudinal slot to receive said lug and prevent rotation of the sleeve thereon, said sleeve having an annular concentric flange formed on one end thereof, a hub arranged on the sleeve extending into said dust cap and between the flange and the sleeve, and a clamping nut threaded on the end of the arbor adapted to move the sleeve inwardly into binding engagement with the dust cap, substantially as and for the purpose specified.

3. In combination, a support an arbor having a square head formed on one end thereof, said support having a recess to receive the head, the other end of said arbor having a short longitudinally extending slot therein, a dust cap arranged on the arbor having pins formed thereon at diametrically opposite points, said support being provided with recesses to receive said pins, a sleeve on said arbor, said sleeve having an annular concentric flange formed on the outer end thereof, a lug formed on said sleeve adjacent to its end disposed in the slot in said arbor to prevent rotation of the sleeve thereon, a hub rotatably arranged on the sleeve and extending into the dust cap and between said sleeve and the flange thereon, and a clamping nut threaded upon the outer end of the arbor engaged with the end of the sleeve adapted to move the same inwardly into binding engagement with said dust cap to retain the lugs thereon in the recesses of said support, substantially as and for the purpose specified.

In testimony whereof I hereunto affix my signature in the presence of two witnesses.

EDWARD SILAS DOYLE.

Witnesses:
C. L. CHRISTIAN,
L. M. ATCHESON.